United States Patent [19]
Wills et al.

[11] 4,404,764
[45] Sep. 20, 1983

[54] MESSAGE MEDIUM HAVING CORRESPONDING OPTICAL AND TACTILE MESSAGES

[75] Inventors: David V. Wills; Angela B. Wills, both of Philadelphia, Pa.

[73] Assignee: Handy C. Priester, West Covina, Calif.; a part interest

[21] Appl. No.: 291,114

[22] Filed: Aug. 7, 1981

[51] Int. Cl.³ .......................... B42D 15/02; G09F 1/02
[52] U.S. Cl. .......................... 40/124.1; 273/DIG. 27; 283/1 R; 428/187; 428/7; 229/92.8; 434/113
[58] Field of Search ...................... 434/112, 113, 117; 273/DIG. 27; 229/92.8; D19/1; 283/1 R; 428/187, 195, 7; 40/124.1

[56] References Cited

U.S. PATENT DOCUMENTS 3,667,759  6/1972  Barr ........................... 273/DIG. 27
3,986,283  10/1976  Pelaez ........................ 229/92.8 X

FOREIGN PATENT DOCUMENTS 319206  11/1902  France ........................... 229/92.8

OTHER PUBLICATIONS

AIDS and Appliances, pp. 1-11, Catalog of American Foundation for the Blind, Jul. 1972-Jun. 1973 edition.
Beck, J., "'Tactile' Maps Will Help Blind Get Around in D.C.", The Washington Star, Mar. 3, 1975, p. B-2.

Primary Examiner—Alexander S. Thomas
Attorney, Agent, or Firm—Steele, Gould & Fried

[57] ABSTRACT

A method of information transfer for sightless persons, sighted persons and mixed sightless and sighted persons comprises the steps of choosing and conveying a message from a stock of messages, the messages being set forth on a message medium in optically discernible form and in tactilely discernible form, said forms at least partly corresponding. The optical form comprises text and/or pictorial depictions, and the tactile form comprises braille. The method is especially applicable to greeting cards.

3 Claims, 8 Drawing Figures

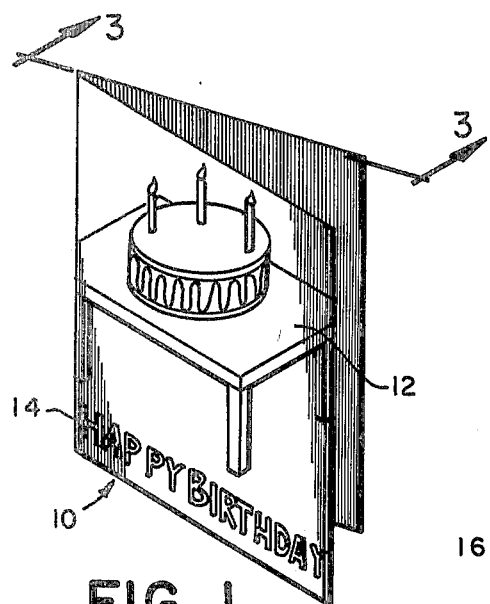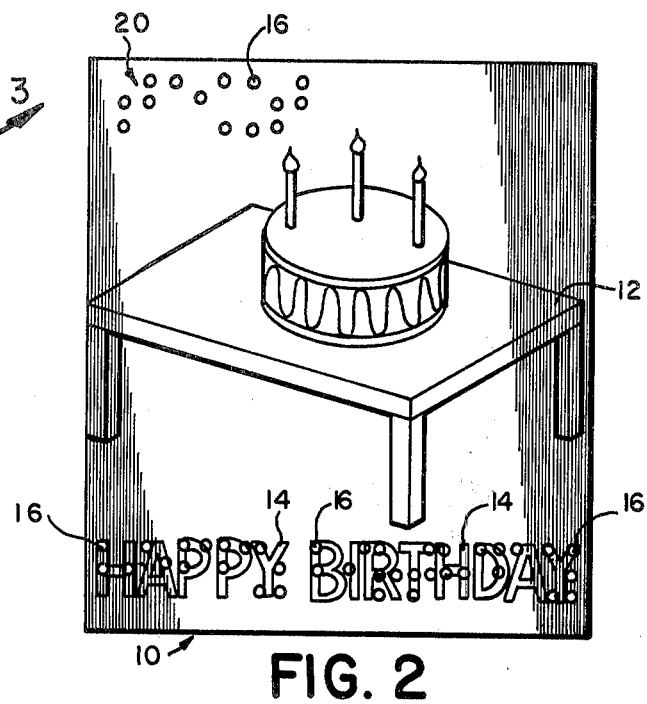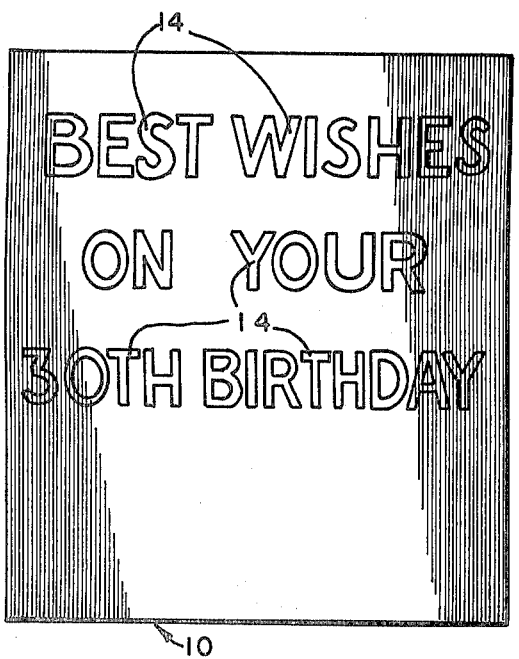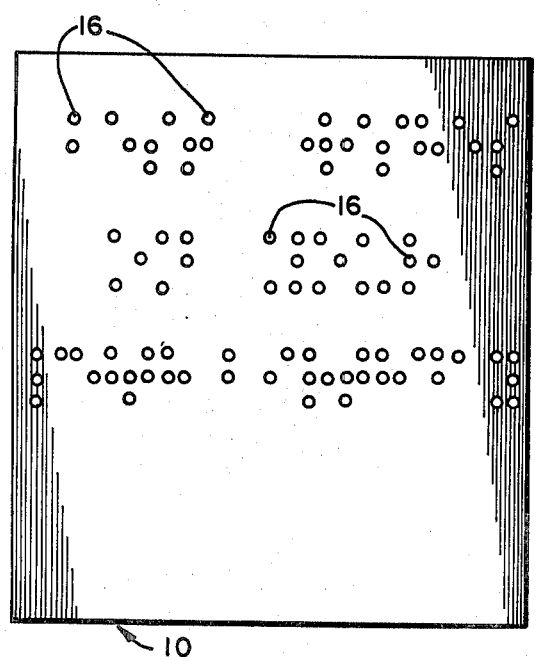
FIG. 1
FIG. 2
FIG. 3a
FIG. 3b

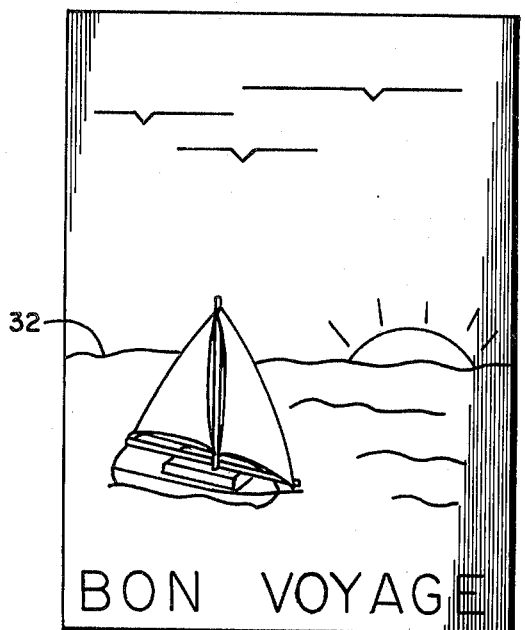
FIG. 4
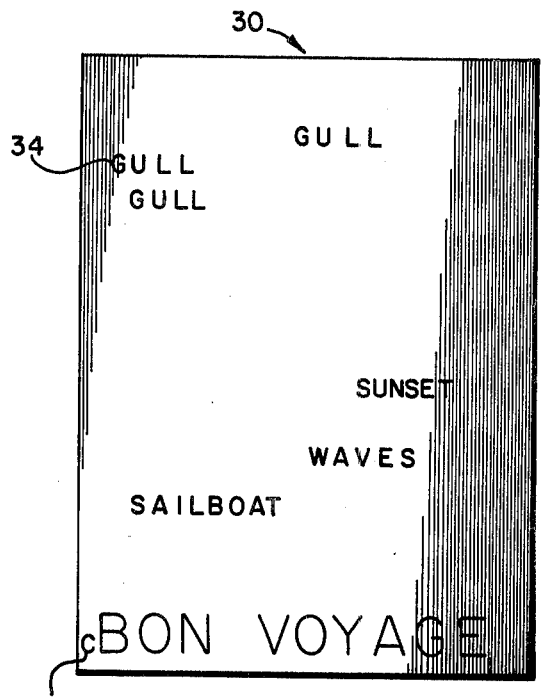
FIG. 5
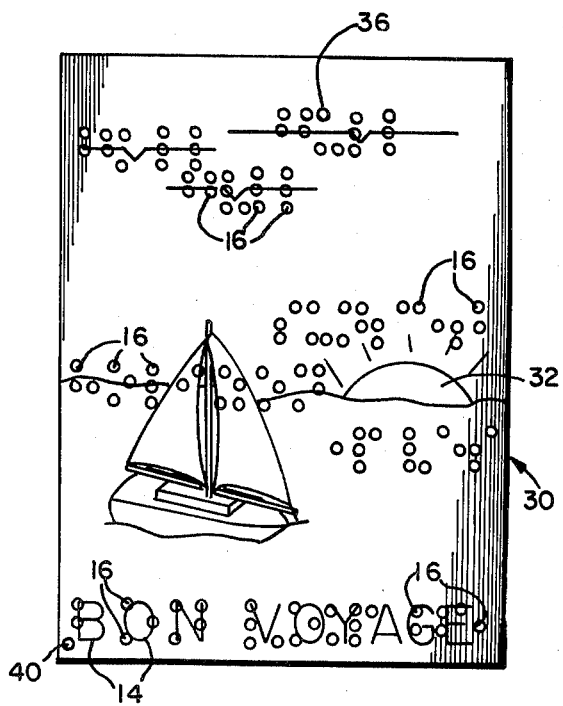
FIG. 6
FIG. 7

MESSAGE MEDIUM HAVING CORRESPONDING OPTICAL AND TACTILE MESSAGES

BACKGROUND OF THE INVENTION

1. Field of the Invention

This invention relates to the field of communication by sightless persons, and in particular to a method of communication applicable to sightless persons, sighted persons and mixed sightless and sighted persons.

2. Description of the Prior Art

The use of braille impressions as a means of conveying information to and from sightless persons has long been known. In general, braille is a code in which each of the letters and numerals of the conventional arabic alphabet is represented by a combination of raised dots peculiar to that letter or numeral. The field in which a single letter or numeral is represented is a matrix of six dots, three dots high by two dots wide. Inasmuch as the codes for the letters A through J are the same codes as for the numerals one through nine and zero, an extra code is provided to notify the reader that the code immediately following is to be interpreted as a numeral. A second extra code notifies the reader that the code immediately following is to be read as a capital letter.

Persons who learn to read and write braille become quite proficient in the skill, and are able to quickly read braille text by merely passing their fingers over the raised dots. Apparatus is available for writing in braille, the apparatus operable to raise dots in the chosen combinations on a paper or other medium. By avoiding exactly aligning the matrices of raised braille dots, braille may be "printed" on both sides of a sheet without interference.

Braille has been applied to various conventional devices, whereby such devices become useful to sightless persons. U.S. Pat. No. 2,091,146—Hamilton discloses a braille clock and U.S. Pat. No. 2,289,717—Montgomery discloses a braille slide rule. Both these patents disclose apparatus in which all possible times of day or calculation results are coded by increments on the respective devices, in braille. In the slide rule, a slidable position indicator permits the user to read the result of a calculation as the numeral coded in braille at the position indicated by the slide. In the braille clock, times of day are coded on a rotating dial, and a position indicator marks the current time.

Hamilton's braille clock is also readable by sighted persons, conventional arabic numerals appearing alongside the braille impressions. The time conventionally appearing in the space indicated also appears in braille within a marked space.

While Montgomery's slide rule is certainly useful for sightless persons, the device is awkward for sighted persons, unless such sighted persons are also proficient in braille. Hamilton's braille clock, which also employs optically-discernible characters, is readable by sighted persons and sightless persons alike. Nevertheless, even in Hamilton's clock, the device does not form a means of communication between sighted and sightless persons. Rather, the device is adapted to convey information to either sightless persons or sighted persons, and not therebetween.

U.S. Pat. No. 3,784,763—Budrose teaches a universal recording card having ferromagnetic strips for audio recording, the card also having braille impressions thereupon. The braille impressions represent the same information recorded on the audio strip. Although Budrose does not teach a specific use for such dual recordation of information, since aurally and tactilely recorded information are both included, it is presumed that the device is useful for teaching the reading of braille to sightless persons.

None of the foregoing patents teach a method of communication that is likewise applicable to communications between sighted persons, sightless persons, and communications between sighted and sightless persons. There has therefore been a need for a method of communication which can bridge the gap between sighted and sightless persons, yet requires no specialized knowledge unlikely to be available to either of the communicating persons.

SUMMARY OF THE INVENTION

It is an object of this invention to improve the transfer of information to sightless persons.

It is also an object of this invention to more conveniently allow communication from sightless persons to sighted persons.

It is another object of this invention to facilitate communications between persons without regard to their ability to see, and without any requirement of specialized knowledge commonly available only to sighted or sightless persons.

It is yet another object of this invention to provide a medium whereby conventional message media may be adapted to be applicable to sightless persons without great expense.

These and other objects are accomplished by a method of information transfer for sightless persons, sighted persons and mixed sightless and sighted persons, comprising the steps of choosing and conveying a message from a stock of messages, the messages being set forth on a message medium in optically discernible form and in tactilely discernible form, said forms at least partly corresponding. The optical form comprises text and/or pictorial depictions, and the tactile form comprises braille. The method is especially applicable to greeting cards.

BRIEF DESCRIPTION OF THE DRAWINGS

There are shown in the drawings the embodiments of the invention which are presently preferred. It should be understood, however, that the invention is not limited to the precise arrangements and instrumentalities depicted.

FIG. 1 is a perspective view of a greeting card according to this invention.

FIG. 2 is a front elevation view of the greeting card of FIG. 1.

FIG. 3(*a*) is an elevation view of the inner face of the greeting card of FIG. 1, the view taken along line 3—3 in FIG. 1.

FIG. 3(*b*) is an elevation view of the braille impressions corresponding to the text printing on the greeting card of FIG. 1.

FIG. 4 is an elevation view of an alternate embodiment, depicting optically discernible information only.

FIG. 5 is an elevation view of the card of FIG. 4, the optically discernible information of FIG. 4 represented by text.

FIG. 6 is an elevation view of the card of FIGS. 4 and 5, optically discernible and corresponding tactilely discernible information both being presented.

FIG. 7 is a table showing the braille alphabet.

DETAILED DESCRIPTION OF THE PREFERRED EMBODIMENTS

The present invention involves a means of communication applicable to sighted, sightless, and mixed sighted and sightless persons. As particularly applied to a greeting card, optically-readable conventional text and pictures are provided, as well as tactilely readable information, such as braille. A simple tactilely coded translation of the information presented optically appears, and explanatory material may also be tactilely coded. Positioning of the tactile characters can also be used to convey information, for example by superimposition of the forms of writing.

A greeting card 10 according to the invention is shown in FIGS. 1 through 3. The card 10 is conventionally folded to form an outer face and an inner face. Optically-readable information on the card includes text 14 and a pictorial depiction or design 12. Cards such as that shown are normally available in card shops in which consumers sort through a large number of cards to find a card bearing the exact sentiment they have in mind. The cards are sometimes humorous and sometimes sentimental, the relationship between the sender and receiver affecting the form of message and the content which will be socially acceptable.

Inasmuch as the raised dots comprised in braille writing need be only a few millimeters high, a greeting card according to this invention will not be defaced by the proximity or even superimposition of braille on the text and/or drawing. Accordingly, the card appears very much the same as a card bearing only optically discernible information, as used conventionally. In order to more clearly show the invention, the drawings have been prepared with the braille dots represented as circles. It should be understood, however, that the dots will be only marginally visible, for example, under inclined light. In this manner, cards intended to be sent to sighted persons, or without regard to whether a persons is sighted or not, can be provided with braille impressions without substantial impairment of their aesthetic value to sighted persons.

In FIG. 2, the braille and text are shown partly corresponding and partly superimposed. The same card 10 as shown in FIG. 1 has printed text 14 and picture 12, the text 14 corresponding to braille impressions 16 set directly therein. Additional information 20, not strictly corresponding to the optically discernible message, may be included on the card for the convenience of sightless persons only. In this case, the extra information consists of braille impressions 16 indicating the legend "text". This information would inform the braille reader that, although a picture appears on the card, only the legend is written in braille.

The legend, "Happy Birthday", is shown as superimposed print and braille in FIG. 2. It will be appreciated that the braille message need not be superimposed directly on the printed message but will convey the same information if set nearby. It is preferred that the two modes of writing be at least nearby one another, because positioning of the characters on the card itself conveys a certain amount of information and can affect the aesthetic or social qualities of the message. Alternatively, the braille and printed characters can be remotely positioned. In that event, either a longer braille message is necessary to fully describe the illustration, or a braille message having the same relative character positions will be required.

Additional alternative embodiments are possible in which the braille characters are positioned to have an optical effect as well. As noted above, the dots of the braille code need only be a few millimeters high. These few millimeters of irregularity in the surface of the message medium can enhance the optical image if placed directly on a part of the design or pictorial depiction representing an irregular surface. With reference to FIG. 2, the icing on the cake shown in the picture is such an irregular surface. If the word "cake" is coded in braille directly on the icing, the surface appears as irregular as actual icing appears. This method can be similarly employed to give a texture to many different scenes and depicted items, such as foliage, water and the like.

FIGS. 3a and 3b illustrate the legend on the inner face of card 10. The card appears optically as the legend shown in the text 14 of FIG. 3(a), as well as tactilely in the braille impression 16 of FIG. 3(b). A sighted or sightless person need only refer to the appropriate mode of writing to read the message, and can send the message to another person without concern as to whether the other is sighted or sightless. As explained more fully hereinafter, a representation such as that shown in FIG. 3(b) might be placed on the front side of a sheet, on the rear, or partly on both.

In the situation in which the card or other form of communication includes both text and a pictorial depiction, it is preferred that the picture as well as the text be also coded in braille. FIGS. 4 through 6 illustrate such an embodiment. Card 30 in FIG. 4 is provided with a printed message 32 comprising text and a scenic picture. The picture accompanying the text conveys a comparable amount of information, if not more, than the text itself. Accordingly, it is preferred that the content of the picture be tactilely coded, as well as the content of the text. This may be accomplished by inserting a text description of the picture. For example, with reference to FIG. 4, such a description might read "over legend of 'bon voyage', picture shows restful sailboat in foreground of rippled ocean with seagulls flying overhead and the fading sun setting on the horizon in the background". If the description is placed directly on the part of the picture representing the ocean, the texture of the message medium approximates the irregular appearance of waves in the ocean, improving the optical message as well as conveying the tactile one.

The desired information can also be tactilely conveyed, as shown in FIGS. 5 and 6, by the placement of the braille impressions. FIG. 6 shows card 30 having printed text 14 and braille 16 thereupon, as well as pictorial illustration 32 having short, descriptive words set over the parts of the picture described. The content of the respective braille legends is shown in conventional arabic text in FIG. 5, for purposes of illustration. Text 34 in FIG. 5 is a transcription of the braille impressions of FIG. 6. As can be seen from a comparison of FIGS. 4 and 5, the placement of the words, for example, "gull" and "sunset", convey the same information as the descriptive text, due to the positioning of the words on the card. The braille impressions are shown superimposed on the drawing. It will be appreciated that superimposition is not strictly necessary. For example, the braille impressions may also be positioned nearby the components of the picture or printing to which they refer, or a miniature depiction of the scene or text, in braille, can be included in an unoccupied area of the scene or text or in an area representing an irregular surface.

As already noted, braille can be set into both sides of a sheet, provided care is taken to avoid exactly aligning the dots raised on the front and back surfaces. This procedure is known as "interpointing", and presents further possibilities for use with this invention. Using braille impressions raised on the side of a sheet opposite the picture, a second texture can be produced on the picture, namely indentations rather than, or in addition to, raised dots. The depiction of the ocean in FIG. 6 could therefore be imprinted with raised dots (tactilely readable on the front) and indented dots (tactilely readable on the rear), presenting an even more optically realistic depiction of the crests and troughs of actual waves on the ocean. Including interpointing, textures including a smooth surface, raised dots and indentations are possible in any combination to transcribe an optical message into a tactile message, while improving the optical image as well.

FIG. 5 distinguishes between the transcription of the information in the picture and the transcription corresponding to the printed text. With reference to FIG. 7, a "capital" sign is provided in the braille alphabet to indicate a capital letter. In transcribing a partly pictorial and partly printed representation, it is helpful to have an indication of which part of the transcription refers to the text and which part refers to the picture. Accordingly, character 40 in FIGS. 5 and 6 precedes the information representing text, whereby the user is advised that the information immediately following does not form a part of the picture.

Further variations on the inventive concept are possible, and will now be apparent to persons skilled in the art. Reference should be made to the appended claims rather than the foregoing specification as indicating the true scope of the subject invention.

What is claimed is:

1. A medium for conveying information among sighted and sightless persons, comprising:
   a greeting card;
   an optically discernible message printed on the card, the optically discernible message having scenic and textual elements, the scenic elements corresponding to a visual scene and the textual elements corresponding to words; and,
   a tactilely discernible message including braille impressions formed in the card, the tactilely discernible message being a transcription of the optically discernible message, the tactilely discernible message and optically discernible messages having corresponding content and having elements placed in corresponding positions, the tactilely discernible message being braille dots imprinted on both a front surface and a rear surface of the medium, the medium having raised braille dots, depressed braille dots, areas of mixed raised and depressed dots, and open areas, whereby at least four degrees of textured areas are provided, the textured areas corresponding to elements of the optically discernible message, the optically discernible message and the tactilely discernible message conveying both scenic and textual information.

2. The medium of claim 1, wherein said scenic information includes a depiction of at least one feature having a visually uneven surface and the tactilely discernible braille is superimposed on the depiction of the at least one feature, the braille being optically discernible as an uneven surface, whereby the uneven surface is realistically depicted optically and tactilely.

3. The medium of claims 1 or 2, wherein elements of the tactilely discernible message are disposed on corresponding elements of the optically discernible message, whereby positioning of the tactilely discernible elements conveys information regarding elements of the optically discernible message and positioning thereof.

* * * * *